United States Patent [19]

Keefe et al.

[11] 4,238,144
[45] Dec. 9, 1980

[54] AUDIO TAPE FREE LOOP CONTROL ARRANGEMENT FOR MULTIPURPOSE AUDIO-VISUAL FILM CASSETTE

[75] Inventors: William L. Keefe, Cambridge; Paul B. Mason, Magnolia, both of Mass.

[73] Assignee: Polaroid Corporation, Cambridge, Mass.

[21] Appl. No.: 32,945

[22] Filed: Apr. 24, 1979

[51] Int. Cl.³ ............................................. G03B 23/02
[52] U.S. Cl. ...................................... 352/72; 352/130
[58] Field of Search ..................... 352/31, 78 R, 130; 242/199, 201, 205

[56] References Cited

U.S. PATENT DOCUMENTS

| 1,843,972 | 2/1932 | Deforest | 352/31 |
| 1,893,698 | 1/1933 | Crespinel | |
| 1,957,525 | 5/1934 | Brown | |
| 2,962,927 | 12/1960 | Warren | |
| 3,240,329 | 3/1966 | Custin | 352/31 |
| 3,352,204 | 11/1967 | Staar | |
| 3,362,771 | 1/1968 | Rodda | |
| 3,378,328 | 4/1968 | Custin | 352/31 |
| 3,650,610 | 3/1972 | Ajar | 352/31 |
| 3,674,345 | 7/1972 | Chernotsky et al. | 352/31 |
| 3,923,520 | 12/1975 | Burke | 352/78 R |
| 3,936,166 | 2/1976 | Scholz | 352/38 |
| 4,161,758 | 7/1979 | Wray | 360/90 |

OTHER PUBLICATIONS

U.S. Application Ser. No. 869,131.

Primary Examiner—Monroe H. Hayes
Attorney, Agent, or Firm—Frederick A. Goettel, Jr.

[57] ABSTRACT

A multipurpose audio-visual film handling cassette is provided wherein an audio information bearing magnetic tape is interwound with a photographic film strip upon coplanarly mounted supply and takeup spools and wherein the film strip and the audio tape are passed along different paths for photographic and audio operations to be performed thereon. The film strip and the magnetic tape are interconnected and advanced through the multipurpose cassette in a manner such that a free tape loop is formed exterior of the cassette at an audio station during the exposure/recording and project/playback modes of operation of the cassette. The manner of interconnection between, and the respective paths of the tape and film strip, result in the disappearance of the tape loop at the end of each of these operational modes and still further, no loop is formed exterior of the cassette during the processing and subsequent rewind modes of operation. The interconnection of the magnetic tape to the film strip at both the supply and takeup leaders is at a location spaced from the attachment point of the film to the respective spool hubs such that the audio tape at the point at which it is joined to the film strip will be carried along the path of the film strip and away from its own path thereby reducing the free length of tape extending along its path at the end of each operational mode, thus reducing the length of the free tape loop.

10 Claims, 7 Drawing Figures

AUDIO TAPE FREE LOOP CONTROL ARRANGEMENT FOR MULTIPURPOSE AUDIO-VISUAL FILM CASSETTE

BACKGROUND OF THE INVENTION

This invention relates to an audio-visual system and, more particularly, to an improved sound motion picture system employing a multipurpose, photographic film handling cassette. Multipurpose motion picture cassettes from which the film need not be removed during exposure, processing and projection operations are described in prior U.S. Pat. Nos. 3,615,127 of Edwin H. Land, issued Oct. 26, 1961; 3,600,071, issued to Rogers B. Downey on Aug. 17, 1971; and 3,895,862 issued to Joseph A. Stella, et al., on July 22, 1975. Each of the systems described in the aforementioned patents employs a cassette from which the film need not be removed during exposure, processing and projection operations. In these systems, the cassette is operated in the camera for exposure of the film strip and then subsequently, the cassette is loaded into a projector apparatus which first subjects the cassette to a sequence of operations which process the film strip to a viewable condition and then subsequently projects the developed recorded images.

Advantageously, audio operations may also be included in the described cassette system. Exemplary of such an audio-visual system is that described in prior U.S. Pat. No. 3,604,790 of Edwin H. Land, et al. issued Sept. 14, 1971 and U.S. Pat. No. 3,856,387 of William R. Wray, et al. issued Dec. 24, 1974. These latter patents describe a film handling cassette in which the film is permanently retained during sound recording and playback as well as exposure, processing and projection operations. In the latter arrangement, a magnetic sound recording track is included along one or both of the longitudinal borders of the film strip. While these systems provide generally acceptable audio reproduction, the inherent restriction of the narrow path width of the audio tracks, which cannot be allowed to interfere with the image retaining portion of the film strip lying therebetween, limits the level of sound quality which may be achieved, or conversely, substantially increases the sophistication and cost of the sound apparatus necessary for high fidelity stereo reproduction.

A preferred solution to this problem is shown in copending U.S. patent application Ser. No. 869,131 assigned to the assignee of the present application, which application describes an arrangement wherein a photographic film strip and an audio information bearing tape are interwound on a common supply spool and simultaneously unwound from the spool and advanced synchronously along separate paths such that different operational functions may be provided on the film and the tape as they progress along their different paths. In the preferred embodiment, both the film strip and the sound tape are substantially retained within a multipurpose film cassette of the type described above while they are advanced along different, diverging paths from the supply spool to a separate takeup spool where they are again interwound with one another.

In a preferred embodiment of such a cassette employing a film strip and a magnetic tape interwound on common supply and takeup spools, the audio tape is passed through an opening in a cassette wall to the exterior of the cassette to provide access to the tape by the audio drive system and the sound recording and playback transducer. The tape is then guided by suitable means through another opening back into the cassette, and from there it passes to the other of the film spools. Further, with such an arrangement, the length of the magnetic tape extending along its path from one spool to the other is such that it contains a slack loop or portion thereof which permits formation of isolating loops in the tape both before and after contact with the audio transducer and tape drive in order to isolate the portion of the tape being advanced across the transducer at a constant speed from the intermittent advancement of the film strip. Such isolation is necessary in order to obtain the high quality high fidelity stereo sound which is desired. While the described free loop of magnetic recording tape is necessary for operation of the cassette in the recording and playback modes of operation, the loop serves no function during the processing mode of operation of the cassette (i.e., its first rewind) and during subsequent rewinds. Further, it is undesirable to have the free loop extending from the cassette when the cassette is not in operational engagement with either a camera or projector as the possibility of abuse and possible damage to the tape is high if the cassette is not handled extremely carefully.

SUMMARY OF THE INVENTION

Briefly, the present invention provides a photographic film handling cassette of the type described hereinabove containing a strip of photographic film connected at opposite ends to supply and takeup spools upon which the film strip may be alternately wound upon advancement of the film strip along a desired path. The cassette further includes a strip of flexible audio information bearing material interwound with the film strip upon the supply and takeup spools and adapted to be directed along a second path at least different in part from the path of the film strip.

The film strip and the audio tape are interconnected to one another and/or to the supply and takeup spools in a manner such that a free tape loop is formed exterior of the cassette at an audio station during the exposure and project modes of operation of the cassette. The interconnection further results in disappearance of the film loop at the end of each of these operational modes. Still further, no loop is formed exterior of the cassette during processing (first rewind) and subsequent rewinds.

More specifically, the film strip and the tape are of selected lengths such that during advancement between the supply and takeup spools along their respective paths, the length of audio tape extending along its path exceeds the minimum length of the tape path to thus permit formation of a tape loop along the tape path. The tape and film strip are joined together at a given point adjacent at least one end thereof with a common portion extending from the joining point to one of the supply or takeup spools such that upon completion of advancement of the film and tape from one spool to the other, the audio tape at the point at which it is joined to the film strip will be carried along the path of the film strip and away from its own path thereby reducing the length of the tape extending along its path, thus reducing the length of the free tape loop.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

DESCRIPTION OF THE PREFERRED EMBODIMENT

Figure 1:
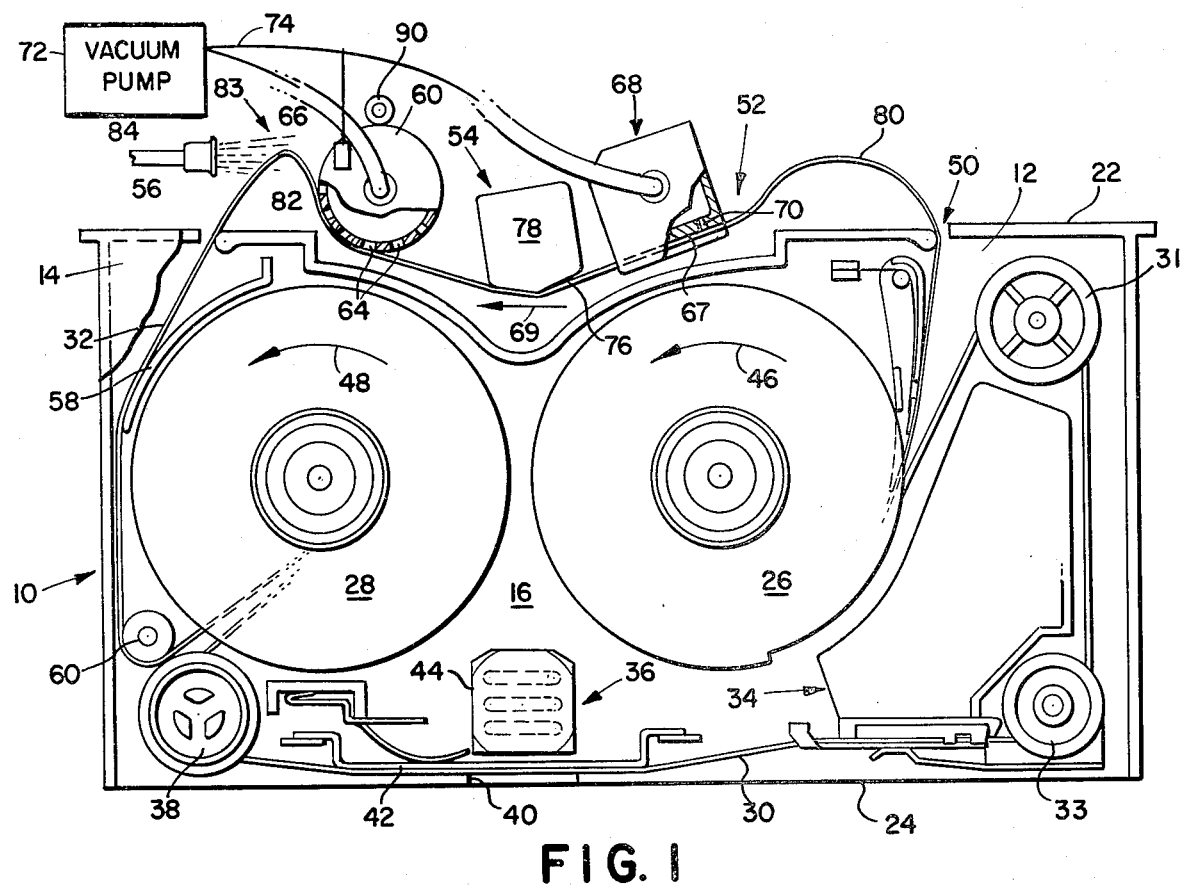
FIG. 1 is a diagrammatic view in elevation, partially cut away to show the interior of a compact, multipurpose audio-visual film handling cassette employing both an audio tape and photographic film strip, such cassette being shown in operating condition wherein a free loop or slack length of the audio tape is present along the audio tape path exterior of the cassette housing to permit audio operations to be performed thereon.

In FIG. 1 of the drawings, a multipurpose audio-visual film/tape handling cassette 10 is illustrated in accordance with the invention. The cassette 10 comprises a generally parallepiped casing or housing 12 constituted by a pair of planar side walls 14 and 16 joined together at their edges by end walls 18 and 20 and elongated top and bottom walls 22 and 24.

The illustrated cassette is a multipurpose cassette similar to that described in the aforementioned patents and copending application wherein the several operations of exposure, chemical processing, drying and projection of the recorded images is accomplished without transferring the photographic film from its cassette. In this structure, processing of the film is automatically initiated responsive to film movement at a given time during the cassette operation. To accomplish this, the film spools and the film itself are operatively associated as described in detail in the above-noted U.S. Pat. Nos. 3,615,127; 3,600,071 and 3,895,862.

As shown in FIG. 1, a supply spool or reel 26 and a takeup spool or reel 28, to which opposite ends of a photographic film strip or web 30 are affixed, are coplanarly mounted within housing 12 for rotation about parallel axes. In the arrangement of the invention, a magnetic tape strip 32 is coupled to the film strip in a manner to be described in detail hereinbelow so that it may be interwound on the supply spool 26 along with the photographic strip 30 to be synchronously advanced therefrom in accordance with the rotation of the film spools. Much, if not all, of the tape width which approximates that of the film 30, is available for sound recording, thereby permitting spaced multiple recording tracks for recording and playback of high fidelity audio information. Advantageously, since both the film strip 30 and the tape 32 are coupled together near their respective supply spool ends, synchronization of the image and sound information is simplified as compared to non-connected strips. Stated otherwise, the fact that both are connected at one or both spools and wound together thereon provides synchronization information which is highly desirable.

As will be subsequently explained, both the photographic film strip 30 and the audio tape 32, while initially advanced together, are subsequently advanced along different paths. In this regard, the path of the photographic film strip 30 which is substantially the same as that employed in the prior noted cassettes, will be first defined. In its path from the supply reel 26, the film strip 30 first encounters a bobulator roller 31, engaging a portion of its periphery as shown, and passes therefrom to an idler roller 33 and then through a film processing station 34. Beyond the film processing station 34, the film 30 extends through and exposure/projection station 36, next passes around a snubber roller 38 and finally passes to the takeup reel 28. The exposure/projection station 36 includes an opening 40 at the bottom wall 24 of the cassette which functions to permit image forming light rays to impinge on the film strip when the cassette is operated in the camera and to subsequently permit light rays from an external source to be directed to the film strip outwardly of the cassette for the projection operations. To facilitate these functions, a pressure plate 42 and a prismatic reflector element 44 are mounted behind the opening 40.

The above-described film strip path may be approximated, as follows, as comprising four substantially straight runs, i.e., a first from the supply spool 26 to the bobulator roller 31, a second from the bobulator roller to the idler roller 33, a third from the idler roller to the snubber roller 38 and, finally, the fourth from the snubber roller to the takeup reel 28. The sum of the length of these four runs is herein defined as a film path of minimum length which a film strip in the cassette of the present invention will follow in passing from the supply spool 26 to the takeup spool 28 and vice-versa. The film strip 30, in passing from the supply spool to the takeup spool during both the exposure and projection operations, undergoes an intermittent motion in passing along the above-defined path of predetermined minimum length; however, during this passage, the length of film strip extending along the path from the two spools may be thought of as, on the average, being equal to the predetermined minimum path length as the film strip, during such passage, is in an alternately lightly tensioned and slackened condition. The significance of this definition of the predetermined minimum path length of the photographic film 30 will be better appreciated as the description of the invention proceeds.

Turning now to the audio tape 32, it should first be noted that the latter is initially fully wound on the supply spool 26 with the film strip and extends from a path to be further described hereinbelow to the takeup spool 28. FIG. 1 represents a cassette 10 during the early stages of either the exposure/recording or projection/playback modes of operation. As such, substantially all of the motion picture film strip 30 and the tape 32 are wound upon the supply spool 26 and are being advanced along their respective paths to the takeup spool 28 with the reels rotating in the directions indicated by the arrows 46, 48, respectively. The audio tape 32, as illustrated in FIG. 1, is in its normal audio operations path wherein the audio tape 32 passes from the cassette through a tape exit opening 50 and therefrom a free loop portion 52 of the magnetic tape formed outside of the cassette housing 12 is advanced past an audio station generally represented at 54, which will be described in more detail hereinbelow. Following passage through the audio station, the tape proceeds to a cassette entry opening 56 where it reenters the cassette and passes downwardly to the left of the takeup spool 28 around an arcuate guide surface 58 to a tape guide roller 60 positioned adjacent the snubber roller 38 and from there is guided by the roller 60 to the takeup reel 28. The audio tape exit and entry openings 50, 56, respectively, are defined by cut-out portions of the cassette top wall 22 and are shaped to define suitable low friction tape guide surfaces 62 and 64, respectively thereat to facilitate smooth unrestrained movement of the audio tape therethrough.

The tape drive and transducer arrangement, the components of which are schematically illustrated in FIG. 1, are of a type capable of providing a highly efficient audio tape drive and transducer arrangement with only one side of the magnetic tape in contact therewith, while providing good transducer magnetic tape contact to provide a high quality stereophonic sound system. Such tape drive transducer systems forms the subject matter of a copending U.S. patent application of R. V. Fischer entitled AUDIO TAPE DRIVE SYSTEM, and filed on even date with the present application. In the illustrated embodiment, the tape drive arrangement includes a rotatably mounted capstan 62 arranged fro driving engagement of a peripheral portion 66 thereof with a length of the magnetic tape. The capstan includes a plurality of openings 64 which are adapted to communicate the interior of the capstan with its outer driving peripheral surface. A tape guide shoe 68 is located upstream from the drive capstan with respect to the direction of motion of the tape during recording or playback as indicated by the arrow 69 in FIG. 1. The guide shoe defines a tape guiding surface 67 which includes one or more slotted openings 70 in its guiding surface which communicates with an interior chamber of the guide shoe.

A vacuum source or pump 72 is provided for communicating through flexible vacuum hoses 74 with the interior of the capstan and the interior chamber of the guide shoe 68. The vacuum pump 72 serves to reduce the pressure within the capstan 62 so as to attract the tape 32 into engagement with the periphery of the capstan and further serves to reduce the pressure within the interior chamber of the guide shoe so as to attract the tape into engagement with the tape guiding surface. The frictional forces resulting from engagement of the tape with the surface 67 serve to retard the movement of the tape 32 in the driven direction. The drive capstan 62 and the guide shoe 68, accordingly, cooperate to provide tension in the portion 76 of the recording tape which extends from the tape guide surface 67 to the drive means when the capstan 62 is rotatably driven and when the vacuum pump 72 is actuated to reduce the pressure within both the capstan and the guide shoe interior chamber.

A suitable magnetic transducer 78 for facilitating recording or playback of audio information responsive to engagement with the sound tape during advancement of the tape therepast is disposed in between the drive capstan 62 and the guide shoe 68 at a position such that the transducer will operably engage the audio information bearing surface of the recording tape when the tape is drawn therepast.

With reference still to FIG. 1, it will be noted that a pair of free loops of magnetic tape 80, 82 respectively, are formed between the tape exit opening 50 and the guide shoe 68 and between the drive capstan 62 and the tape entry opening 56. Such free loops serve to isolate the constant speed motion to which the magnetic tape is subjected when being driven by the capstan from the intermittent motion to which the film strip is subjected during the projection operation by an intermittently advancing claw, for example as shown at 138 adjacent the projection opening 58.

In order to control the length of the free loops 80, 82, a loop control arrangement generally designated at 83 is provided to sense the formation of the free loop 82 passing from the drive capstan 62 to the entry opening 56 in the cassette housing. The loop control means comprises, as simply illustrated in FIG. 1, a light source 84 which may comprise an LED and a photoelectric cell 86 which is connected to suitable motor control circuitry (not shown) which accordingly controls the power application to the drive motor (not shown) which drives the tape drive capstan, the motor output drive shaft 90 being shown engaging the periphery 66 of the drive capstan schematically in FIG. 1. Accordingly, passage of light from the LED 84 to the photoelectric cell 86 is cut off or reduced by formation of the reentry tape loop 82 and this information is sensed by the motor control which alters the power input to the motor, thus slowing the capstan and thus maintaining optimum loop size. As set forth above, it should be appreciated that the free loops formed adjacent both the tape exit and reentry openings are critical in order to isolate the substantially constant speed movement of the magnetic tape past the recording/playback head which is necessary in order to obtain the desirable high fidelity stereo sound. In this regard, it should be appreciated that the loop control circuitry is designed to influence the speed of the drive capstan drive motor at a level which is substantially unnoticeable in regard to acceptable wow/flutter and other sound quality standards.

Accordingly, it should be appreciated that it is necessary to have a free length of magnetic tape formed exterior of the cassette housing 12 extending from the exit opening 50 to the entry opening 56 in order to provide the desired audio operations on the magnetic tape 32. The free length 52 of tape must also be of sufficient length to permit maintenance of the loops for isolating the magnetic tape constant speed drive from the intermittent motion to which the film strip is subjected. On the other hand, as pointed out above, while the described free loop 52 of magnetic recording tape is necessary for operation of the cassette in the exposure/recording and projection/playback modes of operation, the loop serves no function during the processing mode of operation of the cassette, (i.e., during the first rewind) and during subsequent rewinds. Further, it is undesirable to have the free loop extending from the cassette when the cassette is not in operational engagement with either a camera or viewer as the possibility of abuse and possible damage to the relatively fragile tape is high if the cassette is not handled extremely carefully.

Prior to describing in detail the solution to removing the free tape loop 52 extending exteriorly of the cassette, the term "minimum magnetic tape path length" will be defined for future reference purposes as comprising the minimum distance which the magnetic tape 32 will pass in passing along its above-described path from the supply spool 26 to the takeup spool 28 with no free or slack length of tape extending along the path. Accordingly, when following such a minimum path length, the magnetic tape will be in the condition as shown in FIGS. 2 and 3 of the drawings with the magnetic tape 32 drawn taut between the tape exit opening 50 and the entry opening 56.

With the above-stated relationships and operating characteristics of the cassette in mind, it will be appreciated that, during operative advancement of the film strip 30 and the magnetic tape 32 along their respective paths from the supply spool 26 to the takeup spool 28 during the exposure/recording or projection/playback modes of operation, the length of the magnetic tape advancing along the minimum tape path exceeds the above-defined predetermined minimum length of the tape path, thus permitting formation of the slack free loop 52 in order to perform the audio operations thereupon as described above.

Figure 6:
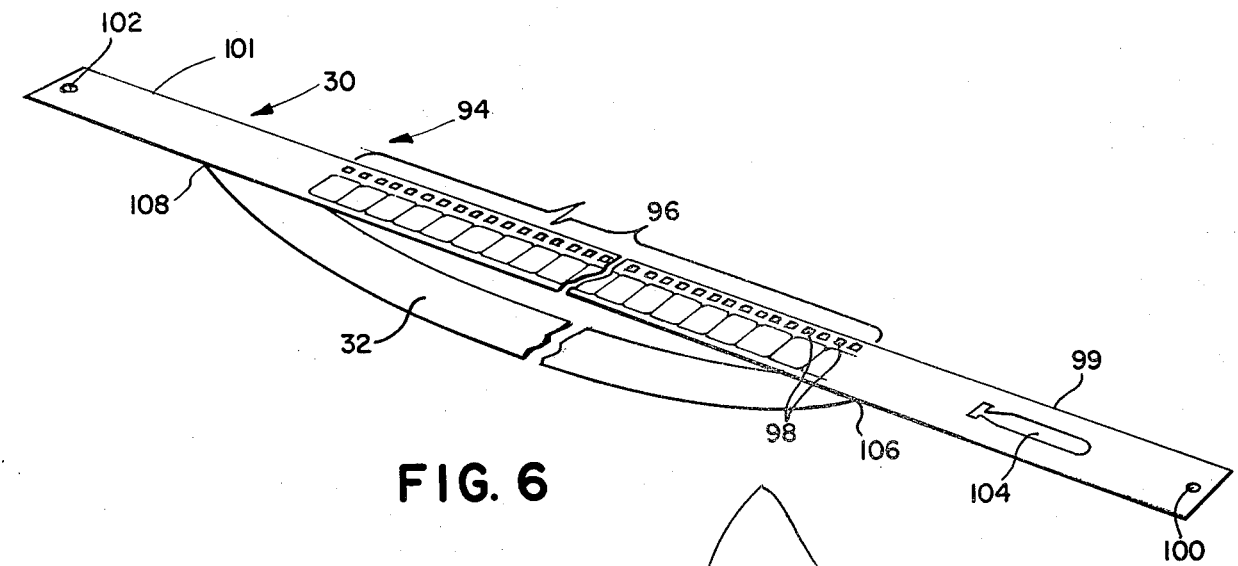
FIG. 6 is a simplified perspective view showing a film strip/audio tape assembly according to the present invention for use with a cassette of any of the other drawing figures.

With reference now to FIG. 6, a photographic film strip and magnetic tape unit 94 assembled according to the present invention is shown. The film 30 is provided with a major central portion 96 of useable film upon which projectable images may be formed, only a part of which is shown in the drawing. Also, a series of uniformly spaced sprocket holes 98 are provided along the length of the film to facilitate incremental film advance during exposure and projection modes of operation. The length of the film strip extends in both directions beyond the major central portion to form both a supply 99 and takeup leader 101, each having an aperture 100, 102 respectively, provided therein for permanent connection of the respective ends of the film strip 30 to the hubs of the supply and takeup spools. The supply leader end 99 of the film strip is provided with a discontinuity, comprising an aperture 104 of bottle-shaped configuration which is adapted to actuate the film cassette processor according to an arrangement described in detail in U.S. Pat. No. 3,895,862 issued July 22, 1975 to Joseph A. Stella, et al. With further reference to FIG. 6, it will be seen that the magnetic tape 32 is attached at its opposite ends to the supply 99 and takeup leaders 101 of the film strip 30 at locations 106 and 108 respectively, which are spaced from the attachment apertures 100,102 where the film strip is attached to the supply 26 and takeup spools 28 respectively. As will be seen, the exact locations of the attachment points 106, 108 of the magnetic tape 32 to the film strip 30 are a function of the desired free length of magnetic tape which is required for the desired audio operations to be performed thereon.

Figure 2:
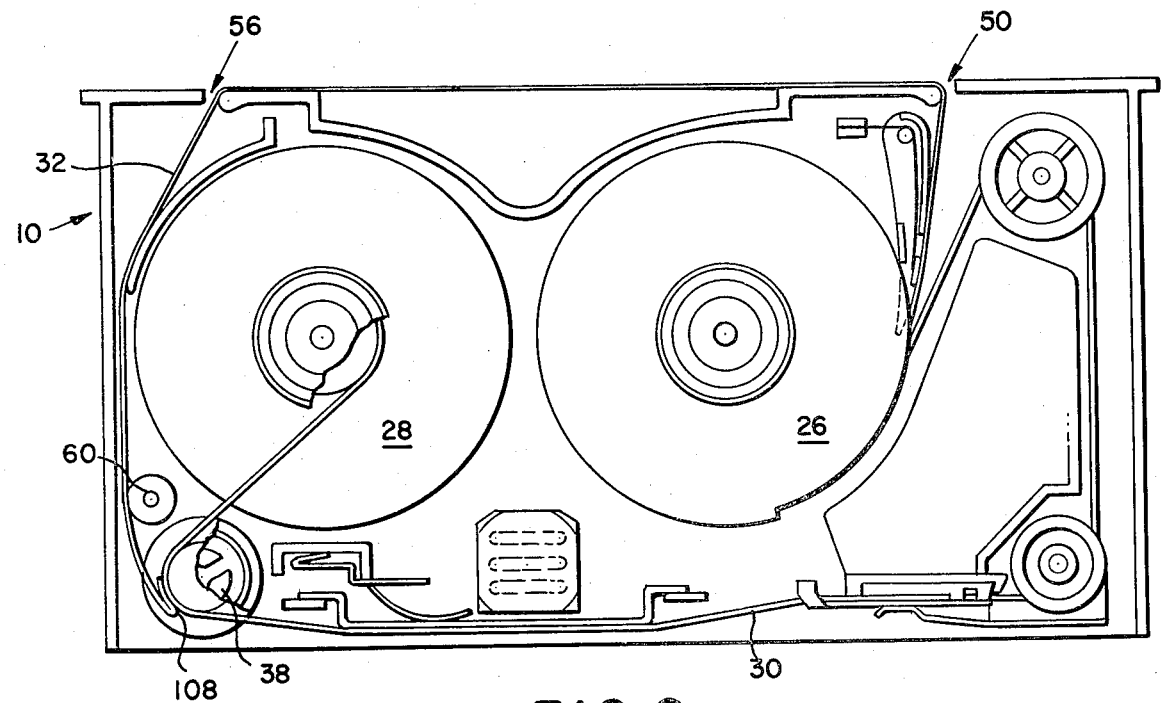
FIG. 2 is a view of the cassette of FIG. 1 showing the cassette in its as assembled condition with substantially all of the film strip and audio tape wound upon the supply reel, showing the audio tape in a taut no slack loop condition.
Figure 3:
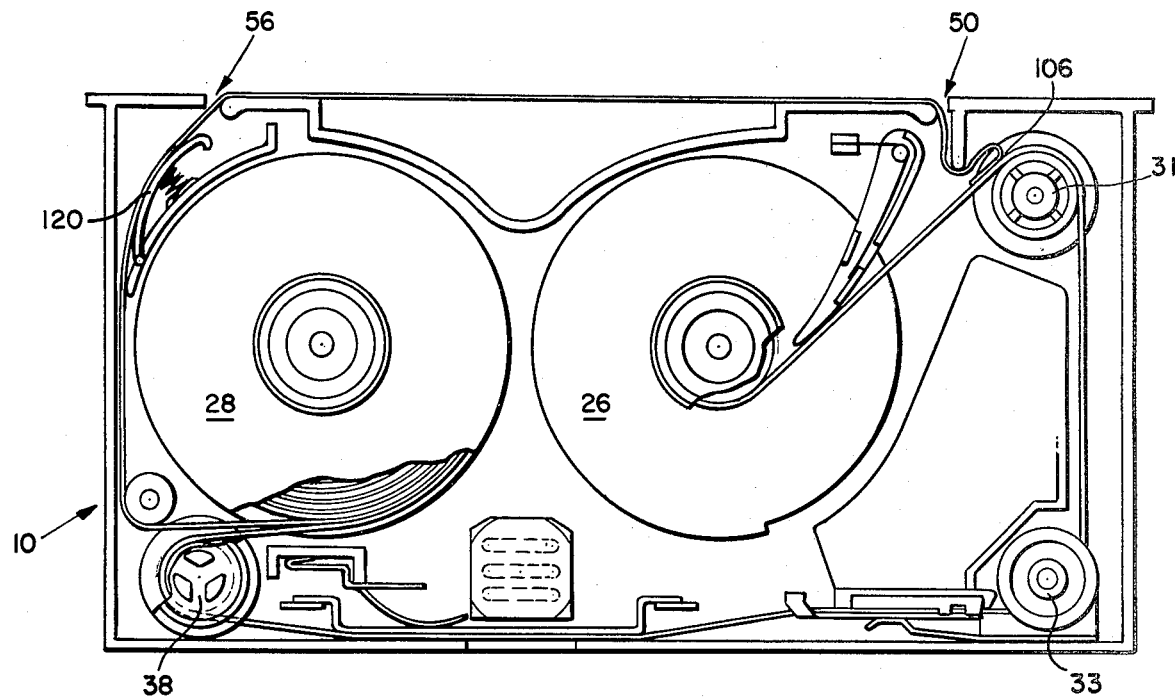
FIG. 3 is a cassette similar to FIG. 1 showing all of the film strip wound upon the takeup reel, again illustrating a no slack loop condition of the audio tape along its path.

Referring now to FIG. 2, a multipurpose cassette of the type shown in operation in FIG. 1 is illustrated with a film strip tape assembly 94 of the type shown in FIG. 6 installed therein. The cassette is in the condition it is in following initial assembly of the cassette with all of the film strip 30 and magnetic tape 32 wound onto the supply spool 26. It should be noted that in this condition, i.e., the condition in which the cassette is handled prior to being placed into a camera for exposure operations, the magnetic tape 32 extends in a taut manner from the exit opening 50 to the entry opening 56 adjacent the top wall 22 of the cassette. Further, with reference to the lower left hand corner of the cassette of FIG. 2, it will be seen that the magnetic tape 32 does not follow its normal operational path as illustrated in FIG. 1, rather, with all of the film strip 30 removed from the takeup spool 28, the magnetic tape has, as a result of its attachment location 100 to the film strip 30, been pulled by the film strip along the film strip's path thereby resulting in a portion of the magnetic tape's slack loop 52 being pulled into the film cassette housing 12 by the taut film strip 30.

Figure 5:
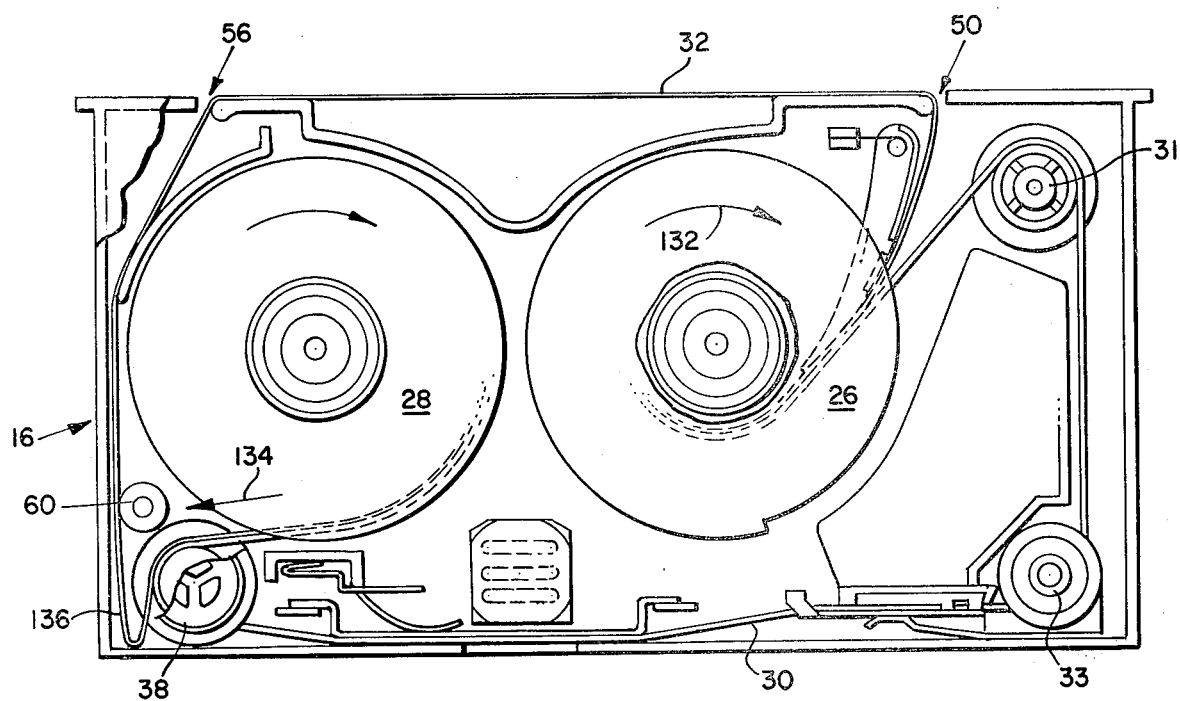
FIG. 5 illustrates a cassette of the type shown in FIG. 1 during the rewind operation showing the retention of the slack loop within the cassette housing.
Figure 7:
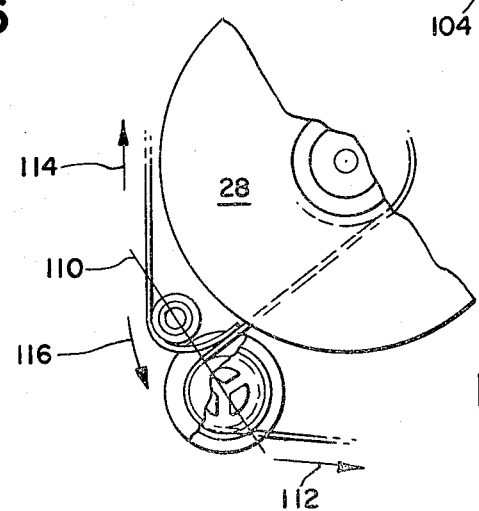
FIG. 7 is a simplified view showing the film strip tape assembly in the takeup spool region at the moment that the tape begins to move in a reverse direction to remove the tape loop.

In order to appreciate how the motion of the substantially taut film strip imparts such a path change to the magnetic tape, reference is made to the simplified showing of the lower left hand corner of a cassette shown in FIG. 7 which represents the condition of the film strip 30 and the magnetic tape 32 and their attachment point 108 on the takeup leader 101 just prior to complete removal of the film strip from the takeup spool 28. In this regard, it will be seen that the attachment point 108 of the tape and film strip lies approximately at a point lying along a line 110 drawn between the rotational axes of the snubber roller 38 and the tape guide roller 60. It should be appreciated that up until this point, the film strip 30 has been moving in the direction represented by the arrow 112 moving along its path towards the supply spool 26. Likewise, up until this point, the magnetic tape 32 had been moving in the direction represented by the arrow 114 along its normal path out of the cassette housing 12 to be interwound with the film strip 30 upon the supply spool 26. Again, up until the time depicted in FIG. 7, the full length of the magnetic tape slack loop 52 was present either exteriorly of the cassette or in the lower left hand corner of the cassette as shown in FIG. 5 and as will be described hereinafter. Further, with reference to FIGS. 2 and 7, it will be seen that continued advancement of the film strip 30 to the supply spool 26 following the condition illustrated in FIG. 7, will result in a change of direction of the slack magnetic tape 32 as it is pulled, in the direction indicated by the arrow 116 in FIG. 7, by the film strip 30 along a portion of the film strip's path. Accordingly, further advancement of the film strip from the condition shown in FIG. 7 to that of FIG. 2 results in pulling of at least a portion of the magnetic tape slack loop 52 along the film strip's path to the supply spool 26.

Further, it should be appreciated that the movement of the film strip from the position illustrated in FIG. 7 to that of FIG. 2 also results in passage of a portion of the magnetic tape slack loop 52 into the cassette through the tape exit opening 50 adjacent the supply spool. Such tape movement necessarily occurs during this period of time as the film strip 30 and the magnetic tape 32 are continuing to be interwound upon the supply spool 26. Briefly summarized, once the attachment point 108 of the magnetic tape and the film strip passes the position illustrated in FIG. 7, half of the free tape loop 52 will pass into the cassette through the tape entry opening 56 and be drawn along the path of the film strip, and, the other half of the free tape loop 52 will pass into the cassette through the tape exit opening 50 as a result of continued rotation of the supply spool 26. Such removal or disappearance of the free tape loop 52 thus will occur each time all of the film strip 30 is rewound upon the supply spool, i.e., following each rewind cycle.

Turning now to FIG. 3 a cassette of the type described in connection with FIG. 1, is shown in its condition following either the exposure/recording or projection/playback mode of operation wherein substantially all of the film strip 30 and the audio tape 32 are interwound upon the cassette's takeup spool 28. With reference to the upper right hand corner of this figure, it will be seen that the interconnection 106 between the film strip supply leader 99 and the supply spool end of the magnetic tape 30 has been drawn to a position 118 adjacent the periphery of the bobulator roller 31. As in the cassette illustrated in FIG. 2, it will be noted that no free slack loop of the magnetic tape 32 is present. The removal of the tape free loop occurs when all of the film strip 30 has been removed from the supply spool 26, according to the same principals as described hereinabove in connection with FIGS. 2 and 7. More specifically, as the quantity of film strip 30 upon the supply spool 26 approaches its end, and as the interconnection 106 between the tape 32 and the film strip 30 is unwound from the supply spool, a point is reached along the film path between the supply spool and the roller 31 wherein the film strip tape interconnection 106 begins to pull magnetic tape 32 into the cassette through the tape exit opening 52 thus reducing the size of the tape free loop 52. Further, as soon as this condition occurs, an equal portion of the slack magnetic tape loop 52 will begin to pass into the cassette through the tape entry opening 56 as the magnetic tape 32 is caused to pass upon the takeup spool 28 along with the substantially taut film strip 30. Referring now to the upper left hand corner of FIG. 3, it will be seen that this cassette is provided with a resiliently supported guide surface 120 which guides the magnetic tape 32 during normal cassette operation along its desired path and which is resiliently displaceable in response to tension in the magnetic tape 32. This arrangement permits a certain amount of tolerance in the exact attachment points of the tape to the film strip, and, further assures that the magnetic tape 32 is drawn taut during the conditions shown in both FIGS. 2 and 3. It should be appreciated that, while not shown in the other drawing figures, such a tensioning arrangement or the equivalent thereof could readily be provided therein.

Figure 4:
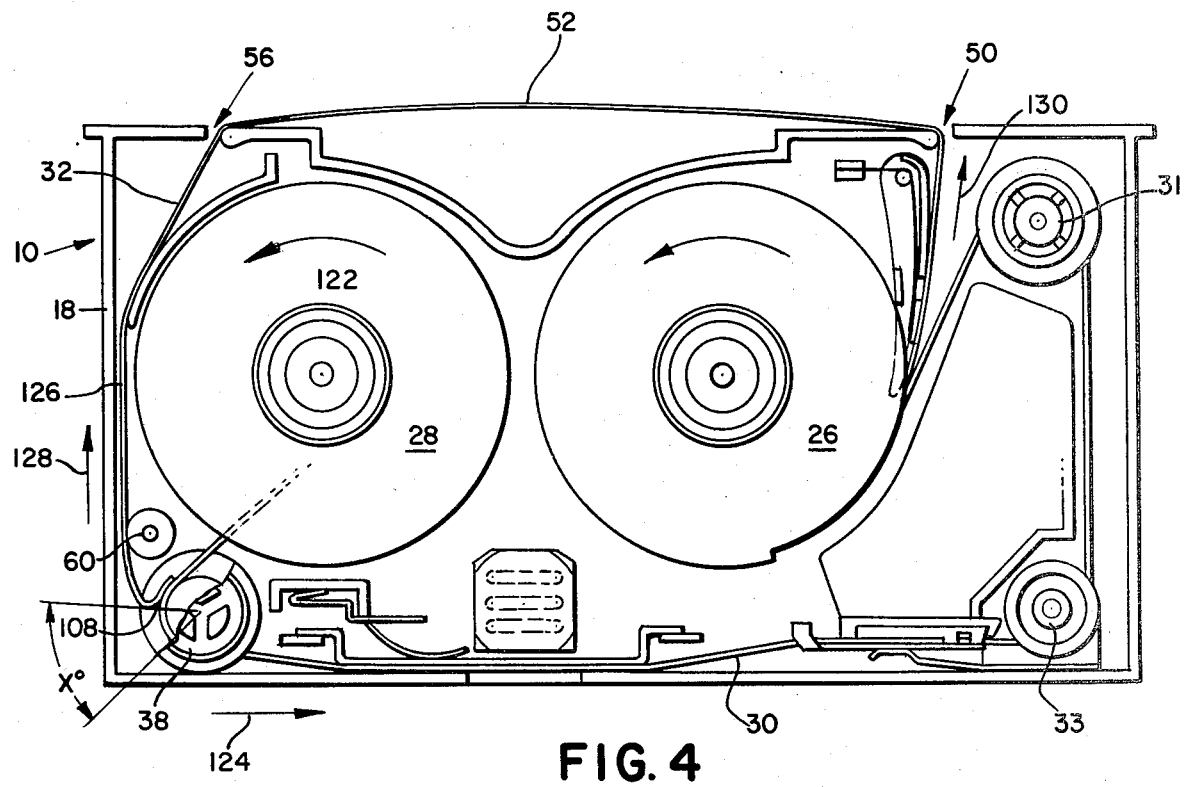
FIG. 4 is a view of a cassette of the type shown in FIG. 1 showing the beginning of the formation of the audio tape slack loop upon initiation of the exposure or projection mode of operation of the cassette.

Accordingly, with respect to FIGS. 2 and 3, it is seen that the magnetic tape free audio loop 52 is not present in the cassette of the present invention either when all of the film strip is carried by either the supply spool 26 or the takeup spool 28. With reference now to FIG. 4, it will be described how the desired free audio slack loop 52 is formed upon initation of either the exposure/record or project/playback modes of operation of the cassette. As indicated, prior to the initiation of either of these cycles, the cassette is in the condition illustrated in FIG. 2. Further, upon initiation of either of these cycles, the takeup spool 28 is driven in the direction as indicated by the arrow 122 in FIG. 4 to thereby begin drawing the film strip 30 and the audio tape 32 from the supply spool 26. FIG. 4 illustrates a cassette in the very early stages of one of these operational modes wherein the movement of the film 30 and the magnetic tape 32 has resulted in a movement of the tape film strip attachment point 108 from its position shown in FIG. 2, by X° with respect to the periphery of the snubber roller 38. It should be appreciated that during this initial period, the film strip 30 is moving in the direction indicated by the arrow 124 in FIG. 4, and the portion 126 of the magnetic tape which passes adjacent the end wall 18 of the cassette is initially being driven upwardly in the direction indicated by the arrow 128, thus driving a portion of the slack tape loop 52 to the exterior of the cassette through the tape entry opening 56. Similarly, during this initial stage of cassette operation, an equal portion of the magnetic tape 32 moving in the direction indicated by the arrow 130 is passing from the supply spool 26 and is being driven upwardly and out of the cassette housing through the tape exit opening 50. Accordingly, equal portions of magnetic tape will be driven from both the tape exit opening 50 and the tape entry opening 56 to thereby form the desired slack loop 52 of magnetic tape exteriorly of the cassette housing immediately upon initiation of the exposure/record and projection/playback modes.

With reference to FIGS. 4 and 7, it will be appreciated that, following passage of the tape/film strip interconnection 108 past the point approximately intersecting the line 110 described in connection with FIG. 7, the magnetic tape 32 will reverse direction from that in which it was initially being driven from the cassette during loop formation as described above and will then pass along its normal path from the guide roller 60 to the takeup spool 28 along with the film strip 30 during normal cassette operation. Such reversal of direction of movement of the magnetic tape 32, however, does not occur until the free loop 52 is formed, and, following that, the loop 52 is maintained at a constant length as the magnetic tape 30 continues to pass along its normal operational path as described in connection with FIG. 1.

As described above, FIG. 3 represents a cassette in the condition either following the exposure/recording or project/playback modes of operation, and accordingly, is ready to be operated upon by the viewer/processing apparatus to rewind the film back upon the supply spool 26 by driving the supply spool 26 in the direction indicated by the arrow 132 in FIG. 5. With reference to both FIGS. 3 and 5, it will be seen that, as the supply spool 26 begins to turn in this direction, the film strip 30 will draw the magnetic tape to its attachment point 60 downwardly towards the supply spool 26. During this period of time, the magnetic tape 32 becomes slack and forms a slack length in the region between the bobulator roller 31 and the supply spool 26. This slack length of the magnetic tape, however, remains within the cassette housing until the attachment point 106 passes down onto the supply spool 26 and the tape is drawn onto the supply spool to be interwound thereupon with the film strip. Also, during this initial period when the magnetic tape is slack in the region between the bobulator roller 31 and the supply spool 26, it will be appreciated that tape is being removed from the takeup spool 28 along with the film strip 30 as the film strip passes to the supply spool 26. The portion of tape removed from the takeup spool at this time is driven from the takeup spool substantially to the left as indicated by the arrow 134 in FIG. 5. Because there is no tension in the tape 32 at this time, the tape is constrained to form a slack loop 136 within the cassette as illustrated in FIG. 5. The tape remains in this slack loop 136 during substantially the entire passage of the tape to the supply spool 26 as the tape is constrained in this position by virtue to the end wall 18, the tape guide roller 60, and the bobulator roller 31. Accordingly, no free tape loop is present exterior of the cassette during the rewind mode of operation. Following passage of all of the film strip 30 and tape 32 to the supply spool 26 the slack loop 136 formed interior of the cassette shown in FIG. 5 will be removed as the tape is drawn on to the supply spool 26 and the cassette will be in the condition illustrated in FIG. 2 ready for further projection/playback operation.

Accordingly, a multipurpose photographic film cassette has been provided wherein an audio information bearing magnetic tape is interwound with a photographic film upon coplanarly mounted supply and takeup spools and wherein the film strip and the audio tape are passed along different paths for photographic and audio operations to be performed thereon. The film strip and the magnetic tape are interconnected and advanced through the multipurpose cassette in a manner such that a free tape loop is formed exterior of the cassette at an audio station during the exposure/recording and project/playback modes of operation of the cassette. The interconnection and path of the tape and film strip further result in the disappearance of the film loop at the end of each of these modes and still further, no loop is formed exterior of the cassette during the processing and subsequent rewind modes of operation.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. An audio-visual system having a film strip and an audio tape coupled at their respective ends to supply and takeup spools for advancement thereof from one of said spools to the other, means for defining a film path of a predetermined minimum length extending between said spools and through a photographic station and for defining a tape path of predetermined minimum length extending between said spools and through an audio station, and said film path being different at least in part from said tape path, and said film strip and tape being of selected lengths and intercoupled with each other or said spools such that during advancement between said spools along their respective paths, the length of tape advancing along said tape path exceeds said predetermined minimum length of said tape path to thereby permit formation of a tape loop along said tape path, the improvement wherein said tape and film strip are joined together at a given point adjacent one end thereof with a common portion extending from said given point to one of said spools such that upon completion of advancement of said film and tape from said one spool, the tape at said given point is carried along said film path and away from said tape path so as to reduce the length of tape extending along said tape path and thereby reduce said tape loop.

2. The system of claim 1 wherein the one end of said tape is joined to said film strip at a point spaced from the one end of said film strip, and said one end of said film strip is connected to said one spool so that the section of said film strip between the point of connection of said tape and the said one end of said film strip provides said common portion.

3. An audio-visual cassette having a housing retaining a film strip and an audio tape coupled at their respective ends to supply and takeup spools for advancement from one of said spools to the other, means for defining a film path of predetermined minimum length extending between said spools and through a photographic station of said housing and for defining a tape path of predetermined minimum length extending between said spools and through an audio station of said housing, said film path being different at least in part from said tape path, and said film strip and tape being of selected lengths and intercoupled with each other or said spools such that during advancement between said spools along their respective paths, the length of tape advancing along said tape path exceeds said predetermined minimum length of said tape path to thereby permit formation of a tape loop along said tape path, the improvement wherein said tape and film strip are joined together at a given point adjacent one end thereof with a common portion extending from said given point to one of said spools such that upon completion of advancement of said film and tape from said one spool, the tape at said given point is carried along said film path and away from said tape path so as to reduce the length of tape extending along said tape path and thereby reduce said tape loop.

4. The cassette of claim 3 wherein said loop of tape extends beyond the perimeter of said housing, and said common portion is of sufficient length such that upon completion of advancement from said one spool, said loop is reduced so as to draw said loop of tape closely adjacent to or within said perimeter.

5. A dual web cassette having a first web and a second web coupled at their respective ends to supply and takeup spools for advancement from one of said spools to the other, means for defining a first web path extending between said spools and for defining a second web path of given length extending between said spools, and said second path being different at least in part from said first path, and said first and second webs being of selected lengths and intercoupled with each other or said spools such that during advancement between said spools along their respective paths, the length of said second web advancing along said second path exceeds the length of said second path to thereby permit formation of a loop in said second web along said second path, the improvement wherein said webs are joined together at a given point adjacent one end thereof with a common portion extending from said given point to one of said spools such that upon completion of advancement of said webs from said one spool, said second web at said given point is carried along said first path and away from said second path so as to reduce the length of said second web extending along said second path and thereby reduce said loop.

6. An audio-visual cassette having a housing retaining a film strip and an audio tape coupled at their respective ends to supply and takeup spools for advancement from one of said spools to the other, means for defining a film path of predetermined minimum length extending between said spools and through a photographic station of said housing and for defining a tape path of predetermined minimum length extending between said spools and through an audio station of said housing, said film path being different at least in part from said tape path, and said film strip and tape being of selected lengths and intercoupled with each other such that during advancement between said spools along their respective paths, the length of tape advancing along said tape path exceeds said predetermined minimum length of said tape path to thereby permit formation of a tape loop along said tape path, the improvement wherein said tape and film strip are joined together at a given point adjacent said supply end of said film strip with a common portion extending from said given point to said supply spool such that upon completion of advancement of said film and tape from said supply spool to said takeup spool, the tape at said given point is carried along said film path and away from said tape path so as to reduce the length of tape extending along said given tape path and thereby reduce said tape loop.

7. The cassette of claim 6 wherein said tape and film strip are joined together at a second given point adjacent said takeup spool end of said film strip with a common portion extending from said second given point to said takeup spool such that upon complete advancement of said film and tape from said takeup spool to said supply spool, the tape at said second given point is carried along said film path and away from said tape path so as to reduce the length of tape extending along said tape path and thereby reduce said tape loop.

8. The cassette of claim 7 wherein said loop of tape extends beyond the perimeter of said housing, and said common portion extending from both said given point and said second given point is of sufficient length such that upon completion of advancement from either of said spools to the other, said loop is reduced so as to draw said loop of tape closely adjacent to or within said perimeter.

9. The cassette of claim 8 wherein said means for defining a tape path further includes means for permitting the length of said second web which exceeds the length of said given path to pass to the exterior of said housing upon initiation of advancement of said film strip and said tape from said supply spool to said takeup spool thereby permitting substantially immediate formation of said loop in said second web along said second path.

10. The cassette of claim 9 wherein said means for defining said tape path further includes means for effecting retention of said length of said second web which exceeds said second path length within said cassette housing upon initiation of advancement of said film strip and said second web from said takeup spool to said supply spool.

* * * * *